US010127000B2

(12) United States Patent
Hobbs et al.

(10) Patent No.: US 10,127,000 B2
(45) Date of Patent: Nov. 13, 2018

(54) MOSAIC GENERATING PLATFORM METHODS, APPARATUSES AND MEDIA

(71) Applicants: Rowland Hobbs, New York, NY (US); George Dy, Oakland, CA (US); Duke Sherman, New York, NY (US); David Sonnenberg, Tenafly, NJ (US)

(72) Inventors: Rowland Hobbs, New York, NY (US); George Dy, Oakland, CA (US); Duke Sherman, New York, NY (US); David Sonnenberg, Tenafly, NJ (US)

( * ) Notice: Subject to any disclaimer, the term of this patent is extended or adjusted under 35 U.S.C. 154(b) by 158 days.

(21) Appl. No.: 15/369,337

(22) Filed: Dec. 5, 2016

(65) Prior Publication Data
US 2017/0083274 A1    Mar. 23, 2017

Related U.S. Application Data

(63) Continuation-in-part of application No. 14/689,657, filed on Apr. 17, 2015, now Pat. No. 9,558,577, which is a continuation-in-part of application No. PCT/US2013/065438, filed on Oct. 17, 2013, and a continuation-in-part of application No. 13/625,288, filed on Sep. 24, 2012, now abandoned, which is a continuation of application No. PCT/US2012/055261, filed on Sep. 14, 2012, said application No. 14/689,657 is a continuation-in-part of application No. 14/198,301, filed on Mar. 5, 2014, now abandoned, which is a continuation-in-part of application No. 29/412,733, filed on Feb. 7, 2012, now Pat. No. Des. 718,776, and a continuation-in-part (Continued)

(51) Int. Cl.
| G06F 3/00 | (2006.01) |
|---|---|
| G06F 3/14 | (2006.01) |
| G06F 3/0485 | (2013.01) |
| G06F 3/0488 | (2013.01) |
| G06T 11/60 | (2006.01) |

(52) U.S. Cl.
CPC .......... *G06F 3/1446* (2013.01); *G06F 3/0485* (2013.01); *G06F 3/04883* (2013.01); *G06T 11/60* (2013.01)

(58) Field of Classification Search
CPC .. G06F 3/04883; G06F 3/1446; G06F 3/0485; G06T 11/60
See application file for complete search history.

(56) References Cited

U.S. PATENT DOCUMENTS

| 6,636,648 B2 | 10/2003 | Loui |
|---|---|---|
| 7,296,224 B2 | 11/2007 | Atkins et al. |

(Continued)

OTHER PUBLICATIONS

International Search Report, issued in related international application, PCT/US2012/055261, dated Dec. 20, 2012.

(Continued)

*Primary Examiner* — Muhammad N Edun
(74) *Attorney, Agent, or Firm* — Day Pitney LLP

(57) ABSTRACT

A group of images may be obtained. The number of images and dates associated with images in the group may be determined. Possible template configurations for the group of images may be determined based on the number of images and the dates associated with the images. A mosaic may be generated from the group of images in accordance with an optimal template configuration.

20 Claims, 4 Drawing Sheets

Related U.S. Application Data of application No. 29/412,735, filed on Feb. 7, 2012, now Pat. No. Des. 718,777, and a continuation-in-part of application No. 29/412,736, filed on Feb. 7, 2012, now Pat. No. Des. 719,963, and a continuation-in-part of application No. 29/412,738, filed on Feb. 7, 2012, now Pat. No. Des. 719,964, and a continuation-in-part of application No. 29/412,739, filed on Feb. 7, 2012, now Pat. No. Des. 718,778, said application No. 14/689,657 is a continuation-in-part of application No. 29/433,980, filed on Oct. 8, 2012, now abandoned, and a continuation-in-part of application No. 29/433,983, filed on Oct. 8, 2012, now abandoned, and a continuation-in-part of application No. 29/433,999, filed on Oct. 8, 2012, now abandoned, and a continuation-in-part of application No. 29/434,010, filed on Oct. 9, 2012, now abandoned, and a continuation-in-part of application No. 29/434,016, filed on Oct. 9, 2012, now abandoned, and a continuation-in-part of application No. 29/434,024, filed on Oct. 9, 2012, now abandoned, and a continuation-in-part of application No. 29/434,029, filed on Oct. 9, 2012, now abandoned, and a continuation-in-part of application No. 29/434,041, filed on Oct. 9, 2012, now abandoned, and a continuation-in-part of application No. 29/434,057, filed on Oct. 9, 2012, now abandoned, and a continuation-in-part of application No. 29/434,434, filed on Oct. 12, 2012, now abandoned, and a continuation-in-part of application No. 29/434,599, filed on Oct. 15, 2012, now abandoned, and a continuation-in-part of application No. 29/434,877, filed on Oct. 17, 2012, now abandoned, and a continuation-in-part of application No. 29/434,885, filed on Oct. 17, 2012, now abandoned, and a continuation-in-part of application No. 29/434,887, filed on Oct. 17, 2012, now abandoned, and a continuation-in-part of application No. 29/434,888, filed on Oct. 17, 2012, now abandoned, and a continuation-in-part of application No. 29/434,892, filed on Oct. 17, 2012, now abandoned, and a continuation-in-part of application No. 29/434,894, filed on Oct. 17, 2012, now abandoned, and a continuation-in-part of application No. 29/434,895, filed on Oct. 17, 2012, now abandoned.

(60) Provisional application No. 61/716,185, filed on Oct. 19, 2012, provisional application No. 61/671,405, filed on Jul. 13, 2012, provisional application No. 61/774,551, filed on Mar. 7, 2013.

(56) References Cited

U.S. PATENT DOCUMENTS

| | | | |
|---|---|---|---|
| 7,340,676 | B2 | 3/2008 | Geigel et al. |
| 7,411,578 | B2 | 8/2008 | Shuhami |
| 7,474,801 | B2 | 1/2009 | Teo et al. |
| 7,743,322 | B2 | 6/2010 | Atkins |
| 7,956,847 | B2 | 6/2011 | Christie |
| 8,064,710 | B2 | 11/2011 | Mizoguchi |
| 8,078,969 | B2 | 12/2011 | Harrison |
| 8,159,550 | B2 | 4/2012 | Paine et al. |
| 8,184,916 | B2 | 5/2012 | Matraszek et al. |
| 8,189,066 | B2 | 5/2012 | Oota |
| 8,189,880 | B2 | 5/2012 | Wen et al. |
| 8,212,834 | B2 | 7/2012 | Bogart et al. |
| 8,290,281 | B2 | 10/2012 | Xiao |
| 9,245,209 | B2 | 1/2016 | Eschbach |
| 2002/0009229 | A1 | 1/2002 | Fu |
| 2002/0189189 | A1 | 12/2002 | Kupczyk |
| 2003/0072486 | A1 | 4/2003 | Loui et al. |
| 2003/0187984 | A1 | 10/2003 | Banavar et al. |
| 2003/0231202 | A1 | 12/2003 | Parker et al. |
| 2005/0223347 | A1 | 10/2005 | Okuaki |
| 2008/0232697 | A1 | 9/2008 | Chen et al. |
| 2009/0083637 | A1 | 3/2009 | Skakkebaek et al. |
| 2010/0008570 | A1 | 1/2010 | Urashima |
| 2010/0043017 | A1 | 2/2010 | Paul |
| 2011/0129159 | A1 | 6/2011 | Cifarelli |
| 2011/0143811 | A1* | 6/2011 | Rodriguez ......... G06K 9/00986 455/556.1 |
| 2011/0292077 | A1* | 12/2011 | Lapstun ............. H04N 1/00129 345/632 |
| 2012/0099156 | A1 | 4/2012 | Chen |
| 2012/0159314 | A1 | 6/2012 | Schrier et al. |
| 2013/0024757 | A1 | 1/2013 | Doll et al. |
| 2015/0039984 | A1 | 2/2015 | Asano |
| 2015/0221117 | A1 | 8/2015 | Hobbs |
| 2017/0208357 | A1* | 7/2017 | Greene ............. H04N 21/4312 |

OTHER PUBLICATIONS

Steve Bunting, DBB Kazaa Database File—1st 9 Fields plus Kazaa Hash Decoded, Dec. 2003.

G. Ponder, Instagram alternative EyeEm hits the Marketplace, published on Apr. 25, 2012 on the wpcentral.com website.

Tom Warren, Windows Phone 8 in detail: new Start Screen, multicore support, VoIP integration, and NFC, published Jun. 20, 2012 on theverge.com.

Matthew Miller, Windows Phone 7 Companion, Nov. 2010, Wiley. Reference Unavailable.

MG Siegler, Distilled from Burbn, Instagram Makes Quick Beautiful Photos Social, Sep. 2010.

https://itunes.apple.com/us/app/iphoto/id497786065?mt=8, iPhoto for iPhone 4, iPhone4S, iPhone 5, iPod touch (4th generation), iPod touch {5th ge . . . , downloaded on Nov. 28, 2012.

USPTO Non-Final Office Action, issued in related U.S. Appl. No. 14/198,301, dated Oct. 22, 2014.

USPTO Final Office Action, issued in related U.S. Appl. No. 14/198,301, dated Aug. 6, 2015.

International Preliminary Report on Patentability with Written Opinion, issued in related international application, PCT/US2012/055261, dated Jan. 13, 2015.

USPTO Non-Final Office Action, issued in related U.S. Appl. No. 13/625,288, dated Nov. 30, 2012.

USPTO Final Office Action, issued in related U.S. Appl. No. 13/625,288, dated Mar. 4, 2013.

USPTO Final Office Action, issued in related U.S. Appl. No. 13/625,288, dated Jun. 13, 2013.

USPTO Non-Final Office Action, issued in related U.S. Appl. No. 13/625,288, dated Jun. 26, 2015.

USPTO Non-Final Office Action, issued in related U.S. Appl. No. 14/689,657, dated Apr. 26, 2016.

* cited by examiner

EXEMPLARY MGP MOSAIC HANDLING (MH) COMPONENT

EXEMPLARY MGP DATA FLOW

EXEMPLARY MGP TEMPLATE CONFIGURATION DETERMINING (TCD) COMPONENT

EXEMPLARY MGP COORDINATOR

MOSAIC GENERATING PLATFORM METHODS, APPARATUSES AND MEDIA

This disclosure describes MOSAIC GENERATING PLATFORM METHODS, APPARATUSES AND MEDIA (hereinafter "MGP"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

CROSS REFERENCE TO RELATED APPLICATIONS

This patent application is a continuation-in-part of claims the benefit of priority to U.S. patent application Ser. No. 14/689,657 ('657 application), filed Apr. 17, 2015.

The '657 application in turn claims the benefit of priority to International Patent Application No. PCT/US13/65438, filed Oct. 17, 2013, which in turn claims the benefit of priority to U.S. provisional patent application No. 61/716,185, filed Oct. 19, 2012. The '657 application additionally claims the benefit of priority to and is a continuation-in-part of U.S. patent application Ser. No. 13/625,288, filed Sep. 24, 2012, which in turn is a continuation of and claims the benefit of priority to International Patent Application No. PCT/US2012/55261, filed Sep. 14, 2012 and claims the benefit of priority to U.S. Provisional Patent Application Ser. No. 61/671,405, filed Jul. 13, 2012.

The '657 application is also a continuation-in-part of and claims the benefit of priority to U.S. patent application Ser. No. 14/198,301, filed Mar. 5, 2014, which in turn claims the benefit of priority to U.S. Provisional Patent Application Ser. No. 61/774,551, filed Mar. 7, 2013.

The '657 application is also a continuation-in-part of and claims the benefit of priority to U.S. patent application Ser. No. 14/198,301, filed Mar. 5, 2014, which in turn claims the benefit of priority to and is a continuation-in-part of U.S. patent application Ser. No. 29/412,733, filed Feb. 7, 2012, U.S. patent application Ser. No. 29/412,735, filed Feb. 7, 2012, U.S. patent application Ser. No. 29/412,736, filed Feb. 7, 2012, U.S. patent application Ser. No. 29/412,738, filed Feb. 7, 2012, and U.S. patent application Ser. No. 29/412,739, filed Feb. 7, 2012. The present application is also related to U.S. Provisional Application Ser. No. 61/693,358, filed Aug. 27, 2012.

The '657 application is also a continuation-in-part of and claims the benefit of priority to U.S. patent application Ser. No. 29/433,980, filed Oct. 8, 2012, U.S. patent application Ser. No. 29/433,983, filed Oct. 8, 2012, U.S. patent application Ser. No. 29/433,999, filed Oct. 8, 2012, U.S. patent application Ser. No. 29/434,010, filed Oct. 9, 2012, U.S. patent application Ser. No. 29/434,016, filed Oct. 9, 2012, U.S. patent application Ser. No. 29/434,024, filed Oct. 9, 2012, U.S. patent application Ser. No. 29/434,029, filed Oct. 9, 2012, U.S. patent application Ser. No. 29/434,041, filed Oct. 9, 2012, U.S. patent application Ser. No. 29/434,057, filed Oct. 9, 2012, U.S. patent application Ser. No. 29/434,434, filed Oct. 12, 2012, U.S. patent application Ser. No. 29/434,599, filed Oct. 15, 2012, U.S. patent application Ser. No. 29/434,877, filed Oct. 17, 2012, U.S. patent application Ser. No. 29/434,885, filed Oct. 17, 2012, U.S. patent application Ser. No. 29/434,887, filed Oct. 17, 2012, U.S. patent application Ser. No. 29/434,888, filed Oct. 17, 2012, U.S. patent application Ser. No. 29/434,892, filed Oct. 17, 2012, U.S. patent application Ser. No. 29/434,894, filed Oct. 17, 2012, U.S. patent application Ser. No. 29/434,895, filed Oct. 17, 2012. Every patent application referenced in this document is incorporated by reference in its entirety for any purpose whatsoever.

FIELD

The present disclosure is directed generally to digital picture management platforms.

BACKGROUND

With the advent of digital cameras and their inclusion into smart phones, tablets, laptops and other portable electronic devices, it has become easier than ever for people to take photos. Some people choose to print out their digital photos, while others choose to view their digital photos on screens of their portable electronic devices, computer monitors or big screen TVs.

SUMMARY

The purposes and advantages of embodiments of the present disclosure will be set forth in and become apparent from the description that follows. Additional advantages of the disclosed embodiments will be realized and attained by the methods, systems, computer programs and mobile computing devices particularly pointed out in the written description hereof, as well as from the appended drawings.

The present disclosure is directed in some aspects to a processor-implemented method to generate a mosaic. An illustrative method includes obtaining via a processor a group of images, determining via the processor the number of images in the group of images, determining via the processor possible template configurations for the group of images based on the number of images, ranking via the processor images in the group of images with respect to the possible template configurations, calculating via the processor overall rankings for the possible template configurations identifying via the processor an optimal template configuration based on the overall rankings, and generating via the processor a mosaic from the group of images in accordance with the optimal template configuration, the template including a plurality of image tiles, each image tile being capable of being associated with an image.

In accordance with further aspects, determining possible template configurations can further include identifying presentation parameters, and determining possible template configurations for the group of images based on the number of images and the identified presentation parameters. The presentation parameters can include information regarding at least one of (i) device type, (ii) screen resolution, (iii) screen orientation, (iv) screen size and (v) screen form factor of a device on which the mosaic is viewed. The presentation parameters can be identified based on the client utilized by a user by querying the client. The client can be selected from the group including (i) a tablet computer, (ii) a smart phone, and (iii) a television, among others, such as a desktop computer and the like.

The method can further include determining a focal point for an image in the group of images, and adjusting the image's positioning in the mosaic based on the focal point. The focal point of the image can be determined using facial recognition. The image can include a person, and the focal point of the image can be determined via processor to be the person's face. The focal point of the image can be determined based on the composition of the image. The focal point of the image is determined via processor to be a foreground object. Color bands can be analyzed in the image to find background objects or foreground objects. The image's positioning in the mosaic can be adjusted via processor by resizing the image. The image's positioning in the mosaic can be adjusted via processor by performing at least one of (i) centering the image and (ii) cropping the image.

In accordance with a further aspect, the image can be ranked by assigning a numerical value to the image based on its physical attributes. For example, the numerical value of the ranking of the image can be based at least in part on a size score associated with placing the image in an image tile for each image tile of each possible template configuration. The size score of the image can increase the numerical value of the ranking of the image if the image's resolution can be higher than or equal to the resolution of an image tile with which it can be associated. The numerical value of the ranking of the image can be based at least in part on a content score, wherein the content score can be based on at least one of (i) the number of people visible in the image and (ii) whether the image shows scenery. The numerical value of the ranking of the image can be based at least in part on a orientation score, wherein the value of the orientation score can be computed by comparing, via processor, the orientation of the image with the orientation of an image tile. The numerical value of the ranking of the image can be based at least in part on a color fingerprint of the image, wherein the color fingerprint can be computed by comparing, by processor, the image with other images to be placed in the template. The color fingerprint can be based on at least one of (i) hue, (ii) saturation and (iii) brightness.

The method can further include computing an overall ranking of a plurality of templates, including computing, via processor, a score for each template populated with at least one image, and comparing the scores of the templates. The method can further include selecting the template with the highest score to display the images. The method can further include displaying the mosaic on the screen of a user's client as a continuous film strip. The method can alternatively further include displaying the mosaic on the screen of a user's client as a continuous film loop. In either instance the method can further include providing navigation means for a user to use a client's touchscreen to scroll through the pictures in the mosaic and/or providing a sharing means to permit a user to share the mosaic with others.

The sharing means can permit the user to share the mosaic with others by actuating an actuator on the touchscreen of the client. The sharing means can permit the user to share the mosaic with others via a social networking site, a website, or a mobile application, among others. The method can further include providing mosaic modifying means for others to modify the mosaic. The mosaic modifying means can be adapted and configured to permit another user to (i) contribute additional photos to the mosaic or (ii) post textual or audio comments in association with the mosaic. The method still further can include providing printing instruction means for a user to print the mosaic. The printing instruction means can permit the mosaic to be printed out with textual comments posted on the mosaic. The printing instruction means can permit the mosaic to be printed out in photo album format. The printing instruction means can be actuated in connection with payment of a fee via processor. The method further can include dispersing similar images in the mosaic across different areas in the mosaic.

The disclosure further provides a processor-implemented method to generate a mosaic. The method can include obtaining via a processor a group of images, determining via the processor the number of images in the group of images, determining via the processor possible template configurations for the group of images based on the number of images, and generating via the processor a mosaic from the group of images in accordance with the optimal template configuration, the template including a plurality of image tiles, each image tile being capable of being associated with an image. If desired, the method further can include ranking via the processor images in the group of images with respect to the possible template configurations, calculating via the processor overall rankings for the possible template configurations, and/or identifying via the processor an optimal template configuration based on the overall rankings.

The disclosure further provides a system for generating a mosaic, that can include means for obtaining or receiving via a processor a group of images, means for determining via the processor the number of images in the group of images, means for determining via the processor possible template configurations for the group of images based on the number of images, means for ranking via the processor images in the group of images with respect to the possible template configurations, means for calculating via the processor overall rankings for the possible template configurations, means for identifying via the processor an optimal template configuration based on the overall rankings, and means for generating via the processor a mosaic from the group of images in accordance with the optimal template configuration, the template including a plurality of image tiles, each image tile being capable of being associated with an image.

In further accordance with the disclosure, the means for determining possible template configurations can include means for identifying presentation parameters, and means for determining possible template configurations for the group of images based on the number of images and the identified presentation parameters. The presentation parameters can include information regarding at least one of (i) device type, (ii) screen resolution, (iii) screen orientation, (iv) screen size and (v) screen form factor of a device on which the mosaic can be viewed. The presentation parameters can be identified based on the client utilized by a user by querying the client, if desired. The client can be selected from the group including (i) a tablet computer, (ii) a smart phone, and (iii) a television, among others. The system further can include means for determining a focal point for an image in the group of images via processor, and means for adjusting the image's positioning in the mosaic based on the focal point via processor. The focal point of the image can be determined using facial recognition. The image can include a person, and the focal point of the image can be determined via processor to be the person's face. The focal point of the image can be determined based on the composition of the image. The focal point of the image can be determined via processor to be a foreground object. Color bands can be analyzed via processor to find background and/or foreground objects.

The image's positioning in the mosaic can be adjusted via processor by resizing the image. The image's positioning in the mosaic can be adjusted via processor by performing at least one of (i) centering the image and (ii) cropping the image. The image can be ranked via processor by assigning a numerical value to the image based on its physical attributes. The numerical value of the ranking of the image can be based at least in part on a size score associated with placing the image in an image tile for each image tile of each possible template configuration. The size score of the image can increase the numerical value of the ranking of the image if the image's resolution can be higher than or equal to the resolution of an image tile with which it can be associated. The numerical value of the ranking of the image can be based at least in part on a content score, wherein the content score can be based on at least one of (i) the number of people visible in the image and (ii) whether the image shows scenery. The numerical value of the ranking of the image can be based at least in part on a orientation score, wherein the value of the orientation score can be computed by comparing, via processor, the orientation of the image with the orientation of an image tile. The numerical value of the ranking of the image can be based at least in part on a color fingerprint of the image, wherein the color fingerprint can be computed by comparing, by processor, the image with other images to be placed in the template. The color fingerprint can be based on at least one of (i) hue, (ii) saturation and (iii) brightness.

In accordance with a further aspect, the system further can include means for computing an overall ranking of a plurality of templates via processor, including means for computing, via processor, a score for each template populated with at least one image, and means for comparing the scores of the templates via processor. The system further can include means for selecting the template with the highest score to display the images via processor. The system further can include means for displaying, via processor, the mosaic on the screen of a user's client as a continuous film strip or as a continuous film loop. In either instance, the system can further include means for providing navigation means via processor to a user to permit the user to use a client's touchscreen to scroll through the pictures in the mosaic and/or further can include means for providing a sharing means via processor to permit a user to share the mosaic with others. The sharing means can permit the user to share the mosaic with others by actuating an actuator on the touchscreen of the client. For example, the sharing means can permit the user to share the mosaic with others via a social networking site, a website, or a mobile application.

The system can further include providing mosaic modifying means via processor for others to modify the mosaic. The mosaic modifying means can be adapted and configured to permit another user to (i) contribute additional photos to the mosaic or (ii) post textual or audio comments in association with the mosaic. The system can further include providing means for providing printing instruction means for a user to print the mosaic. For example, the printing instruction means can permit the mosaic to be printed out with textual comments posted on the mosaic. The printing instruction means can permit the mosaic to be printed out in photo album format. The printing instruction means can be actuated in connection with payment of a fee via processor by a user. The system can further include means for dispersing similar images in the mosaic across different areas in the mosaic.

The disclosure further provides a system for generating a mosaic, which can include means for obtaining via a processor a group of images, means for determining via the processor, the number of images in the group of images, means for determining via the processor, possible template configurations for the group of images based on the number of images, and means for generating via the processor, a mosaic from the group of images in accordance with the optimal template configuration, the template including a plurality of image tiles, each image tile being capable of being associated with an image. The system can further include means for ranking via the processor images in the group of images with respect to the possible template configurations, means for calculating, via the processor, overall rankings for the possible template configurations and means for identifying, via the processor, an optimal template configuration based on the overall rankings.

The disclosure further provides a processor-readable computer program stored on a tangible non-transient medium for operating a system for generating a mosaic of a plurality of provided images. The program can include one or more of instructions for obtaining or receiving via a processor a group of images, instructions for determining via the processor the number of images in the group of images, instructions for determining via the processor possible template configurations for the group of images based on the number of images, instructions for ranking via the processor images in the group of images with respect to the possible template configurations, instructions for calculating via the processor overall rankings for the possible template configurations, instructions for identifying via the processor an optimal template configuration based on the overall rankings, and instructions for generating via the processor a mosaic from the group of images in accordance with the optimal template configuration, the template including a plurality of image tiles, each image tile being capable of being associated with an image.

In accordance with further aspects, the instructions for determining possible template configurations can include instructions for identifying presentation parameters, and instructions for determining possible template configurations for the group of images based on the number of images and the identified presentation parameters. The presentation parameters can include information regarding at least one of (i) device type, (ii) screen resolution, (iii) screen orientation, (iv) screen size and (v) screen form factor of a device on which the mosaic can be viewed. The presentation parameters can be identified based on the client utilized by a user by querying the client. The client can be selected from the group including (i) a tablet computer, (ii) a smart phone, and (iii) a television.

In some implementations, the computer program can further include instructions for determining a focal point for an image in the group of images via processor, and instructions for adjusting the image's positioning in the mosaic based on the focal point via processor. The focal point of the image can be determined using facial recognition. The image can include a person, and the focal point of the image can be determined via processor to be the person's face. The focal point of the image can be determined based on the composition of the image. The focal point of the image can be determined via processor to be a foreground object. Color bands can be analyzed via processor to find background and/or foreground objects. The image's positioning in the mosaic can be adjusted via processor by resizing the image. The image's positioning in the mosaic can be adjusted via processor by performing at least one of (i) centering the image and (ii) cropping the image. The image can be ranked via processor by assigning a numerical value to the image based on its physical attributes. The numerical value of the ranking of the image can be based at least in part on a size score associated with placing the image in an image tile for each image tile of each possible template configuration. The size score of the image can increase the numerical value of the ranking of the image if the image's resolution can be higher than or equal to the resolution of an image tile with which it can be associated. The numerical value of the ranking of the image can be based at least in part on a content score, wherein the content score can be based on at least one of (i) the number of people visible in the image and (ii) whether the image shows scenery. The numerical value of the ranking of the image can be based at least in part on a orientation score, wherein the value of the orientation score can be computed by comparing, via processor, the orientation of the image with the orientation of an image tile. The numerical value of the ranking of the image can be based at least in part on a color fingerprint of the image, wherein the color fingerprint can be computed by comparing, by processor, the image with other images to be placed in the template. The color fingerprint can be based on at least one of (i) hue, (ii) saturation and (iii) brightness.

In some implementations, the computer program can include instructions for computing an overall ranking of a plurality of templates via processor, including instructions for computing, via processor, a score for each template populated with at least one image, and instructions for comparing the scores of the templates via processor. The computer program further can include instructions for selecting the template with the highest score to display the images via processor, and instructions for displaying, via processor, the mosaic on the screen of a user's client as a continuous film strip. In further implementations, the computer program further can include instructions for displaying, via processor, the mosaic on the screen of a user's client as a continuous film loop. The computer program further can include instructions for providing a navigation interface via processor to a user to permit the user to use a client's touchscreen to scroll through the pictures in the mosaic. The computer program further can include instructions for providing a sharing interface via processor to permit a user to share the mosaic with others. The sharing interface can permit the user to share the mosaic with others by actuating an actuator on the touchscreen of the client. The sharing interface can permit the user to share the mosaic with others via a social networking site, a website, or a mobile application.

The computer program further can include providing a mosaic modifying interface via processor for other users to modify the mosaic. The mosaic modifying interface can be adapted and configured to permit another user to (i) contribute additional photos to the mosaic or (ii) post textual or audio comments in association with the mosaic.

The computer further can include instructions for providing a printing interface for a user to print the mosaic. The printing interface instructions can permit the mosaic to be printed out with textual comments posted on the mosaic. The printing interface instructions can permit the mosaic to be printed out in photo album format. The printing interface instructions can permit printing to occur upon payment of a fee via processor by a user. The computer program can further include instructions for dispersing similar images in the mosaic across different areas in the mosaic.

The disclosure further provides a processor-readable computer program stored on a tangible non-transient medium for operating a system for generating a mosaic of a plurality of provided images. The program can include instructions for obtaining via a processor a group of images, instructions for determining via the processor, the number of images in the group of images, instructions for determining via the processor, possible template configurations for the group of images based on the number of images, and instructions for generating via the processor, a mosaic from the group of images in accordance with the optimal template configuration, the template including a plurality of image tiles, each image tile being capable of being associated with an image.

The computer program further can include instructions for ranking via the processor images in the group of images with respect to the possible template configurations, instructions for calculating, via the processor, overall rankings for the possible template configurations, and/or instructions for identifying, via the processor, an optimal template configuration based on the overall rankings.

The disclosure further provides a computing device having one or more processors, memory, a display screen and one or more programs, wherein the one or more programs can be stored in the memory and configured to be executed by the one or more processors, the one or more programs including instructions for operating a system for generating a mosaic of a plurality of provided images. The one or more programs can include instructions for providing a user input interface for obtaining or receiving via a processor a group of images, and instructions for displaying via the processor on a client device a mosaic from the group of images in accordance with the optimal template configuration, the template including a plurality of image tiles, each image tile being capable of being associated with an image.

In accordance with further aspects, the client device can be selected from the group including (i) a tablet computer, (ii) a smart phone, and (iii) a television. The computing device further can include instructions for displaying, via processor, the mosaic on the screen of the client device as a continuous film strip or as a continuous film loop. In either instance, the computing device further can include instructions for providing a navigation user interface via processor to a user to permit the user to use a touchscreen of the client to scroll through the pictures in the mosaic, and/or instructions for providing a sharing user interface via processor to permit a user to share the mosaic with others. The sharing user interface can permit the user to share the mosaic with others by actuating an actuator on the touchscreen of the client. The sharing user interface can permit the user to share the mosaic with others via a social networking site, a website, or a mobile application.

In accordance with still further aspects, the computing device further can include providing a mosaic modifying interface via processor for other users to modify the mosaic. The mosaic modifying interface can be adapted and configured to permit another user to (i) contribute additional photos to the mosaic or (ii) post textual or audio comments in association with the mosaic. If desired, the computing device further can include instructions for providing a printing interface for a user to print the mosaic.

BRIEF DESCRIPTION OF THE FIGURES

The accompanying figures and/or appendices illustrate various exemplary embodiments in accordance with the present disclosure.

APPENDICES 1-2 illustrate additional exemplary embodiments of the MGP.

DETAILED DESCRIPTION

Introduction

The MGP introduces a new type of digital picture management platform that facilitates automatic generation of aesthetically balanced image mosaics. These image mosaics may be automatically generated to be aesthetically balanced, visually interesting, readily printed in a photobook, and/or the like. In one embodiment, the MGP may convert a group of photos into a visually stimulating mosaic display of photos using templates and data regarding the photos. For example, a user may create a storyline of an event (e.g., grandpa's 70$^{th}$ birthday) using a mosaic. The user may upload photos of the event and the MGP may generate a mosaic. The user may edit the generated mosaic, share the mosaic with others (e.g., give others permission to add more photos to the mosaic and/or to add comments to photos in the mosaic), print out the mosaic (e.g., as a photo album, as a mosaic), and/or the like. In various embodiments, the MGP may be used to create a storyline, to share images via a social networking platform, to generate a screen saver, and/or the like.

Detailed Description of the MGP

Figure 1:
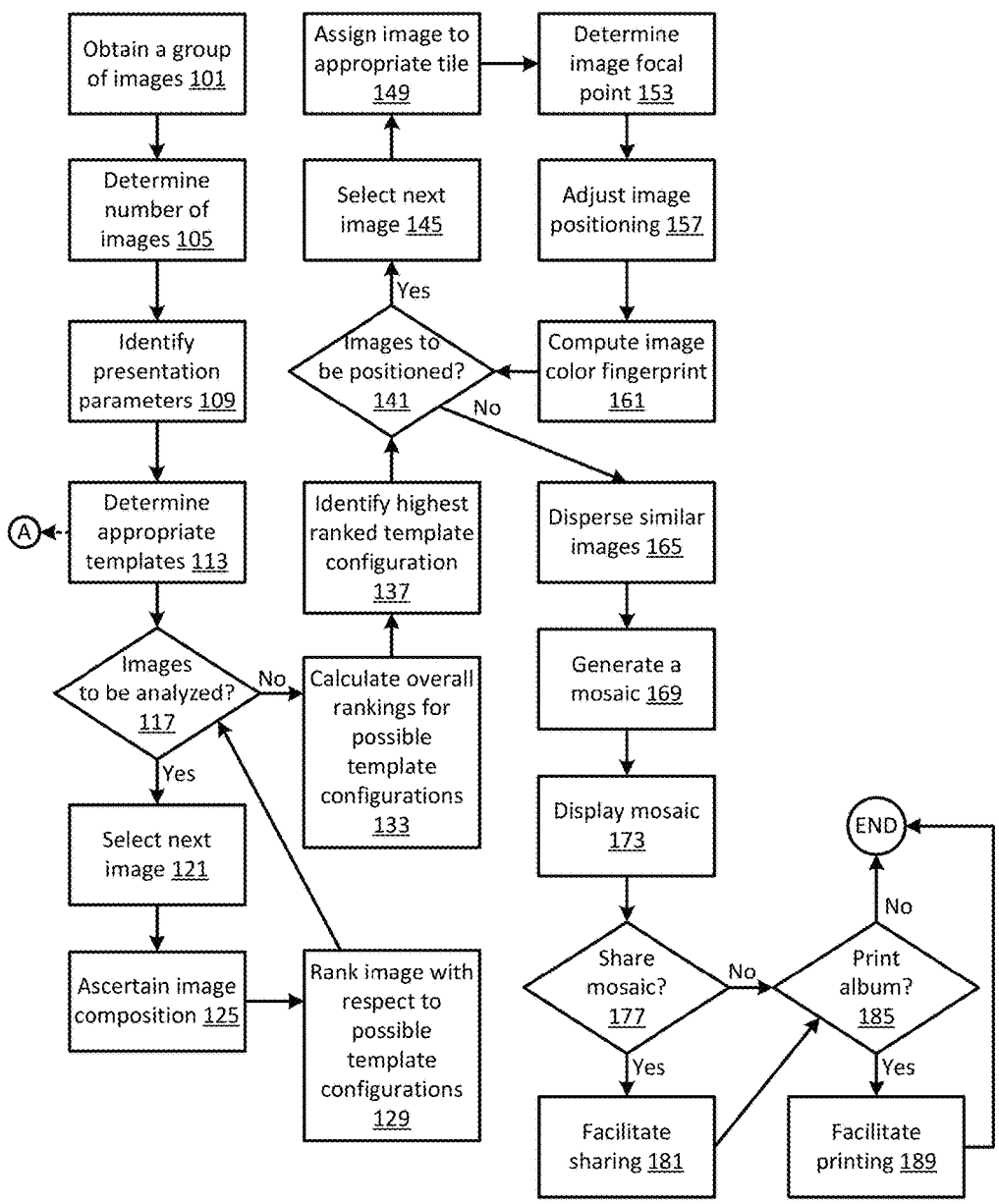
FIG. 1 shows a logic flow diagram illustrating an exemplary mosaic handling (MH) component in one embodiment of the MGP.

FIG. 1 shows a logic flow diagram illustrating an exemplary mosaic handling (MH) component in one embodiment of the MGP. In FIG. 1, a group of images may be obtained at 101. In one embodiment, the group of images may be uploaded by a user (e.g., via a MGP mobile application using a portable electronic device, via a website using a computer). In another embodiment, the group of images may be retrieved from a data store (e.g., images data store 430c). For example, a group of previously uploaded images may be selected by the user (e.g., by clicking a checkbox associated with an image to select the image). In another example, a previously created mosaic may be edited by selecting the group of images that make up the mosaic. In yet another embodiment, the group of images may be obtained (e.g., via an API) from another source automatically (e.g., periodically, based on a notification from the other source). For example, if the user takes a photo with a camera, the camera (e.g., via a MGP mobile application) may be configured to inform the MGP that the photo may be pulled and/or to push the photo to the MGP. In another example, the user may post photos on Facebook, and the MGP may obtain the posted photos daily.

A determination may be made at 105 regarding the number of images in the group. In one embodiment, the MGP may track the number of uploaded images to make this determination. In another embodiment, the MGP may adjust a counter (e.g., add one when the user selects a picture and subtract one when the user deselects a picture) to make this determination.

Presentation parameters may be identified at 109. In one embodiment, presentation parameters may include information regarding device type, screen resolution, screen orientation, screen size, screen form factor, and/or the like of a device on which a mosaic may be viewed. In one implementation, the presentation parameters may be identified based on the client utilized by the user (e.g., by querying the client using a MGP mobile application). For example, if the user is using an iPad, the presentation parameters may be based on the iPad's parameters (e.g., a 9.7-inch 2048-by-1536 resolution screen used in landscape orientation). In another example, if the user is using an Android phone (e.g., Samsung Galaxy SII), the presentation parameters may be based on the phone's parameters (e.g., a 4.3-inch 800-by-480 resolution screen used in portrait orientation). In another implementation, the presentation parameters may be identified based on user specifications. For example, the user may specify (e.g., via GUI widgets of a MGP website) that the mosaic should be optimized for viewing via a website on a 16:9 form factor big screen TV.

Appropriate template configurations for the mosaic may be determined at 113. A template configuration may be an arrangement of templates and/or template sets in a configuration (e.g., an ordered set of templates and/or template sets). A template may be one or more image tiles arranged in a configuration. For example, a template may comprise a single image tile, two identically sized horizontal image tiles one on top another, two similarly sized vertical image tiles next to each other, one large bottom image tile and two smaller top image tiles, and/or the like. See Appendix 1 for additional examples of templates. Also, see the following design patent applications for additional examples of templates that may be strung together edge to edge to form a scrolling mosaic of images: David Sonnenberg, et al., application Ser. No. 29/412,733, filed Feb. 7, 2012; David Sonnenberg, et al., application Ser. No. 29/412,735, filed Feb. 7, 2012; David Sonnenberg, et al., application Ser. No. 29/412,736, filed Feb. 7, 2012; David Sonnenberg, et al., application Ser. No. 29/412,738, filed Feb. 7, 2012; and David Sonnenberg, et al., application Ser. No. 29/412,739, filed Feb. 7, 2012. The entire contents of the aforementioned applications are herein expressly incorporated by reference in their entirety. It is to be understood that, in various implementations, templates, including the above examples, may be implemented (e.g., arranged) or pushed (e.g., to scroll) vertically and/or horizontally. In various embodiments, templates may be arranged to have various shapes, such as rectangular, square, triangular, circular, and/or the like. For example, template data may be stored in the templates data store 430d. A template set may be a plurality of templates (e.g., two templates) of different template types (e.g., a wide template followed by a narrow template). See Appendix 2 for examples of various wide and narrow templates that may be utilized in a template set (e.g., a template set made up of a wide template followed by a narrow template). In one implementation, template configurations using template sets may be restricted to using template set members in the order specified by the template set (e.g., a wide template followed by a narrow template). In another implementation, template configurations using template sets may use template set members in any desired order (e.g., a wide template followed by a narrow template, or a narrow template followed by a wide template). It is to be understood that different types and/or numbers of members may be used in a template set. In one embodiment, the dimensions (e.g., width and/or height of the rectangle formed by the template set) of the template set may be specified such that the template set is larger than the screen size of a client device on which the mosaic may be viewed by a predetermined amount. In one implementation, the width (or height) of the template set may be between 0% and 5% larger than the width (or height) of the client's screen. In another implementation, the width (or height) of the template set may be between 5% and 10% larger than the width (or height) of the client's screen. In yet another implementation, the width (or height) of the template set may be between 10% and 15% larger than the width (or height) of the client's screen. Making the width (or height) of the template set larger than the client's screen width (or height)

may give a viewer of a mosaic a motivation to scroll the mosaic (e.g., from left to right, from top to bottom). For example, if the viewer will view the mosaic on an iPad with a 4:3 screen aspect ratio, the template set may form a rectangle whose dimensions substantially correspond to dimensions of a Golden Rectangle (i.e., having a width to height ratio of approximately 1.618 to 1) and whose width exceeds the width of the iPad's screen by approximately 7%. A dimension "substantially corresponds" if it corresponds to within a specified percentage. In one implementation, this percentage may be between 0% and 5%. In another implementation, this percentage may be between 5% and 10%. In yet another implementation, this percentage may be between 10% and 15%. In some embodiments, templates and/or template sets may be designed so that mosaics do not look crowded on a screen (e.g., when templates are strung together, when mosaics are viewed on mobile devices with small screens). For example, each template may be designed to have no more than six image tiles. In another example, each template set may be designed to have between two and seven image tiles.

Appropriate template configurations may be determined by the MGP based on various factors such as the number of images in the group, dates and/or themes associates with the images, presentation parameters, avoiding repetition of templates and/or template sets, achieving balanced sizing of images, and/or the like. In one embodiment, the number of images in the group may be used for this determination. For example, if there are five images in the group, it may be appropriate to utilize a template configuration comprising either one template with two image tiles and another template with three image tiles, or a template configuration comprising one template with one image tile and another template with four image tiles, or a template configuration comprising one template with one image tile and two templates with two image tiles. In some implementations, the number of images utilized may be affected by image quality (e.g., the level of blurriness). For example, sharpness of an image and/or objects within an image (e.g., determined based on face detection) may be used to decide whether an image should be shown in the mosaic. Further, the specific templates chosen for appropriate template configurations may depend on factors such as image sizes (e.g., big picture, small picture), image orientations (e.g., landscape orientation, portrait orientation), image content (e.g., people, scenery), and/or the like. In some implementations, appropriate template configurations may be determined such that the resulting mosaic would be printer friendly (e.g., when the mosaic is printed out, an image is not split among multiple pages and/or there are no templates in the mosaic with empty image tiles), would not have any dangling images, would not have any templates that are not completely filled, and/or the like. In another embodiment, dates and/or themes associates with the images may be used for this determination. For example, the images may be organized (e.g., sorted and/or grouped) for presentation in a mosaic based on the date and/or time (e.g., the date and/or time when an image was taken, the date and/or time when an image was uploaded, the date and/or time when an image was shared) and/or theme (e.g., theme based on location, theme based on context) associated with the images. Accordingly, appropriate template configurations may be determined such that templates and/or template sets in the appropriate template configurations facilitate presentation of the images in conformity with how the images are organized (e.g., each template and/or template set is dedicated to images from one date and/or theme-based grouping). In yet another embodiment, presentation parameters may be used for this determination. For example, if the mosaic is intended to be viewed on a screen with landscape orientation, it may be appropriate to utilize templates with two rows of wide image tiles. In another example, if the mosaic is intended to be viewed on a screen with portrait orientation, it may be appropriate to utilize templates with three rows of narrow image tiles. In yet another example, identically sized (e.g., based on width and/or height) template sets that may be arranged either horizontally (e.g., from left to right) or vertically (e.g., from top to bottom) may be utilized in template configurations to allow template set-based scrolling that preserves the template configuration regardless of screen orientation. In yet another embodiment, avoiding repetition of templates and/or template sets may be a goal during this determination. In one implementation, certain templates and/or template sets may be disqualified from appearing next to and/or close to each other. For example, two identical templates and/or template sets may not appear next to each other to avoid repetition. In another example, two templates and/or template sets may not appear close to each other based on a minimum distance parameter (e.g., the two templates and/or template sets should have at least one other template and/or template set separating them—minimum distance of one). In yet another embodiment, achieving a balanced sizing of pictures may be a goal during this determination. For example, templates may be sequenced together to have one or two leading pictures (e.g., pictures with people), and some smaller supporting pictures (e.g., scenery pictures). In another example, templates and/or template sets may not appear next to each other based on a maximum difference in number of image tiles parameter (e.g., two templates may not appear next to each other if the number of image tiles in one template differs from the number of image tiles in the other template by more than three—maximum difference in number of image tiles of three). See FIG. 3 for an example of how appropriate template configurations may be determined.

The images in the group may be analyzed to determine an optimal template configuration. At 117, a determination may be made whether there are any images to be analyzed. If so, the next image may be selected for analysis at 121. The image's composition may be ascertained at 125. In one embodiment, the size of the image may be ascertained. For example, a large high resolution photo may look good in a small image tile and in a large image tile, while a small low resolution photo may look good in a small image tile, but bad in a large image tile. In another embodiment, the content of the image may be ascertained. For example, facial recognition may be used to determine whether people and/or animals are present in a photo. If people and/or animals are present in the photo, it may be more preferable to display the photo in a large image tile than to display another photo that shows scenery in a large image tile. In yet another embodiment, the orientation of the image may be ascertained. For example, a photo having landscape orientation may look good in a landscape orientation image tile, but bad in a portrait orientation image tile.

The image may be ranked with respect to possible (i.e., appropriate) template configurations at 129. In one embodiment, the image may be assigned a numerical value associated with placing the image in an image tile for each image tile of each possible template configuration. In one implementation, a photo may be assigned a size score (e.g., 1 if the photo's resolution is higher than or equal to the resolution of an image tile and a 0 if it is lower). In another implementation, a photo may be assigned a content score (e.g., 0.8 if the photo includes one person, 0.4 if the photo include two or more people and 0.1 if the photo shows scenery for a large image tile, and 0.2 if the photo includes one person, 0.6 if the photo include two or more people and 0.9 if the photo shows scenery for a small image tile). In yet another implementation, a photo may be assigned an orientation score (e.g., 1 if the orientation of a photo matches the orientation of an image tile and a 0 if it does not match). In other implementations, factors such as a photo's focal point (e.g., proximity of the focal point to the center of an image tile), a photo's position in an image tile (e.g., an indicator of how aesthetically pleasing the photo would look in the image tile based on default positioning), a photo's fingerprint (e.g., how similar the photo's fingerprint is to fingerprints of other photos in the photo's template and/or in the neighboring templates), and/or the like may affect the numerical value associated with placing the image in an image tile.

In one embodiment, the numerical value associated with placing the image in an image tile may be equal to the sum of the image's component scores (e.g., the sum of the image's size score, content score and orientation score). For example, the numerical value associated with placing a high resolution photo of a person having portrait orientation into a large portrait orientation image tile may be equal to 2.8 (1—size score, 0.8—content score, 1—orientation score). In another example, the numerical value associated with placing a high resolution photo of a person having portrait orientation into a small landscape orientation image tile may be equal to 1.2 (1—size score, 0.2—content score, 0—orientation score).

Once the images in the group are ranked, an overall ranking may be calculated for each possible template configuration at 133. In one embodiment, the overall ranking of a template configuration may be calculated by summing image rankings associated with the template configuration. For example, if the group of images comprises two high resolution photos of a person having portrait orientation, then the overall ranking for a template configuration comprising one template with two large portrait orientation image tiles may be 5.6 (2.8 for each photo), and the overall ranking for a template configuration comprising one template with two large landscape orientation image tiles may be 3.6 (1.8 for each photo since the orientation score would be 0 instead of 1). At 137, the optimal (e.g., highest ranked) template configuration may be identified and selected as the basis for the mosaic.

The images may be positioned in the mosaic according to the optimal template configuration. At 141, a determination may be made whether there are any images to be positioned. If so, the next image may be selected for positioning at 145. The image may be assigned to the appropriate image tile at 149. In one embodiment, the appropriate image tile may be the image tile associated with the image in the optimal template configuration. At 153, the focal point of the image may be determined. In one embodiment, the focal point of the image may be determined using facial recognition. For example, in a photo that includes a person, the focal point of the photo may be the person's face. In another embodiment, the focal point of the image may be determined based on the composition of the image. For example, in a photo that includes a beach house, color bands may be analyzed to find background objects (e.g., sky, water, sand) and foreground objects (e.g., the beach house), and the focal point of the photo may be a foreground object (e.g., the beach house). The image's positioning in its image tile may be adjusted at 157 to provide an optimal viewing experience. In one embodiment, the image may be scaled in accordance with its image tile size. For example, a large photo may be resized to fit into the image tile. In another embodiment, the image may be centered and/or cropped to accentuate the focal point of the image. For example, a photo of a beach house may be centered on the beach house and cropped to make the beach house fill half of its image tile.

At 161, the image's color fingerprint may be computed. In one embodiment, the image's color fingerprint may indicate similarity of the image to other images. For example, beach photos may be considered similar to each other, but different from park photos. In various implementations, factors such as hue, saturation, brightness, and/or the like may be used to calculate the image's color fingerprint. For example, the image's color fingerprint may be a 3-tuple comprising the image's average hue, average saturation and average brightness. Once the images in the group are positioned and their color fingerprints are computed, similar images may be dispersed at 165 to achieve aesthetic balance and/or avoid concentration of similar images in one area of the mosaic. In one embodiment, color fingerprints of the images in the group may be used to disperse similar images. For example, if two image tiles in a template have images with similar fingerprints (e.g., each of the three tuple values for one image differs by less than twenty percent from the corresponding tuple value for another image), the image in the second image tile may be moved to a different area in the mosaic. In one implementation, this may be accomplished by randomly selecting another image tile in a different template (e.g., another identically sized image tile) and switching the images in the two image tiles.

A mosaic may be generated at 169. In one embodiment, a mosaic may be a group of images positioned in image tiles (e.g., in accordance with the optimal template configuration and/or aesthetic balance). For example, the mosaic may be stored in the mosaics data store 330e. The mosaic may be displayed at 173. For example, the mosaic may be displayed on the screen of the user's client as a continuous film strip and/or a loop, and the user may use the client's touchscreen to scroll through the pictures in the mosaic (e.g., by rolling the mosaic left or right).

A determination may be made at 177 whether the user wishes to share the mosaic with others (e.g., the user may click on a "Share" button). If the user wishes to share the mosaic, the MGP may facilitate sharing at 181. In various embodiments, the user may share the mosaic via a social networking site, via a MGP website, via a MGP mobile application, and/or the like to let others view and/or edit the mosaic. For example, others may contribute additional photos to the mosaic, post comments (e.g., textual comments, audio comments) regarding photos in the mosaic, and/or the like.

A determination may be made at 185 whether the user wishes to print out the mosaic (e.g., the user may click on a "Print" button). If the user wishes to print out the mosaic, the MGP may facilitate printing at 189. In one embodiment, the mosaic may be printed out in a mosaic format. For example, the mosaic may be printed out (e.g., along with posted comments) such that each printed page comprises an entire template of the mosaic. In another embodiment, the mosaic may be printed out in a photo album format. For example, the mosaic may be printed out (e.g., depending on paper size chosen by the user, depending on sizes of templates in the mosaic, and/or the like) such that each printed page comprises one or more templates of the mosaic. In some implementations, there may be a fee associated with printing out the mosaic.

Figure 2:
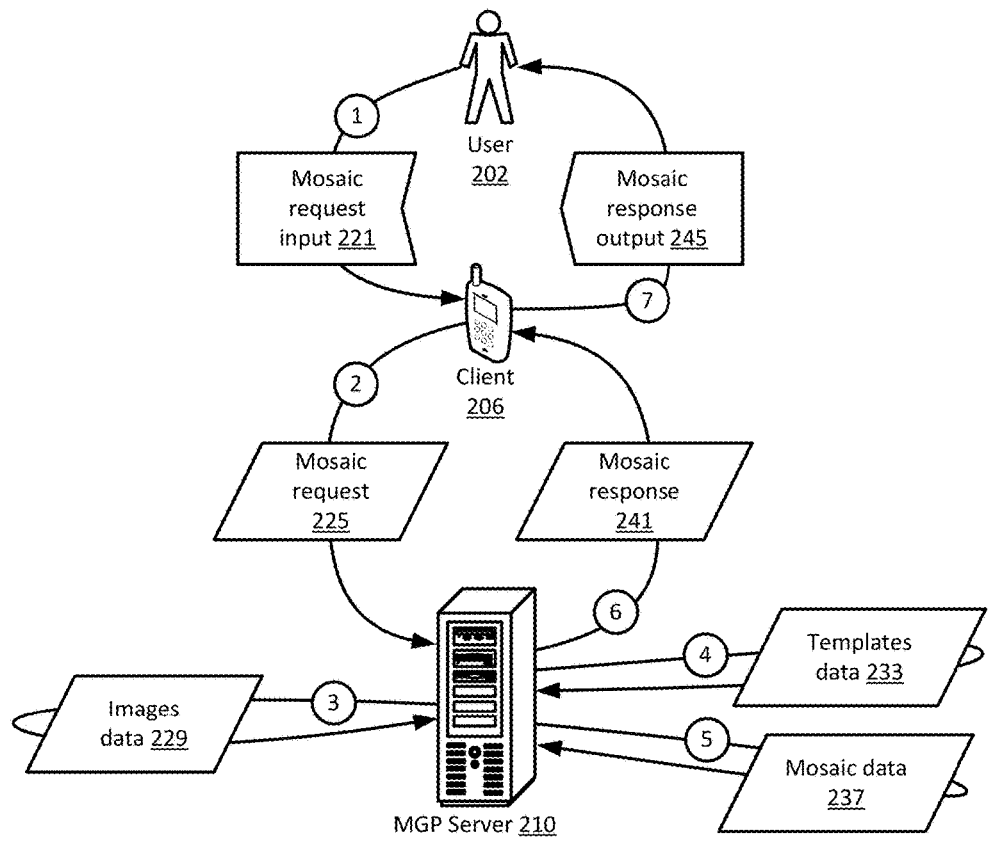
FIG. 2 shows a data flow diagram in one embodiment of the MGP.

FIG. 2 shows a data flow diagram in one embodiment of the MGP. FIG. 2 provides an example of how data may flow to, through, and/or from the MGP platform. In FIG. 2, a user 202 may send a mosaic request input 221 to a MGP client 206. In one embodiment, the mosaic request input may be an activation of a "Create Mosaic" button and/or uploading of images by the user. In another embodiment, the mosaic request input may be a selection of a previously created mosaic by the user and/or activation of an "Edit Mosaic" button.

The MGP client may send a mosaic request 225 to a MGP server 210. For example, the mosaic request may include data such as the user's unique identifier, a client's unique identifier, client device type, client screen resolution, a mosaic name, mosaic images, and/or the like. In one implementation, the mosaic request may be in XML format substantially in the following form:

```
<XML>
    <MosaicRequest>
        <UserID>ID_User</UserID>
        <Client>
            <ClientID>ID_Client</ClientID>
            <ClientType>iPad</ClientType>
            <ScreenResolution>2048-by-1536</ScreenResolution>
        </Client>
        <Mosaic>
            <MosaicName>Grandpa's 70th birthday </MosaicName>
            <Images>list of images for the mosaic</Images>
        </Mosaic>
    </MosaicRequest>
<XML>
```

The MGP server may analyze images data 229 and/or templates data 233 to determine an optimal template configuration and/or image positioning. For example, analyzed images data may include the number of images, image size, image resolution, image orientation, image composition, image content, image focal point, image colors, and/or the like. For example, analyzed templates data may include template shape, template orientation, number of image tiles in a template, configuration of image tiles in a template, orientations of image tiles in a template, sizes of image tiles in a template, resolution of image tiles in a template, and/or the like.

The MGP server may analyze mosaic data 237 to generate an aesthetically balanced mosaic. For example, analyzed mosaic data may include mosaic name, mosaic configuration, mosaic images, mosaic images color fingerprints, mosaic comments, and/or the like.

The MGP server may send a mosaic response 241 to the MGP client. For example, the mosaic response may include data such as a link to the mosaic generated for the user, mosaic data, and/or the like. The MGP client may display a mosaic response output 245 to the user. For example, the MGP client may use a MGP mobile application to display the mosaic to the user on the client's screen.

Figure 3:
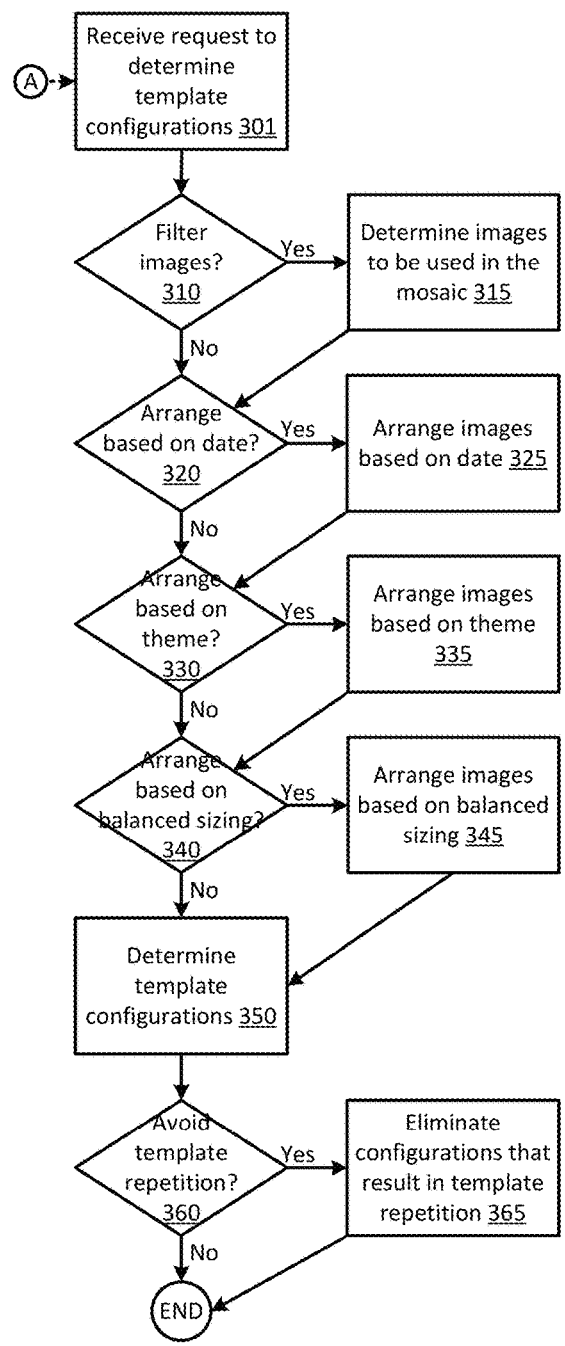
FIG. 3 shows a logic flow diagram illustrating an exemplary template configuration determining (TCD) component in one embodiment of the MGP.

FIG. 3 shows a logic flow diagram illustrating an exemplary template configuration determining (TCD) component in one embodiment of the MGP. In FIG. 3, a request to determine template configurations may be received at 301. For example, this request may be received as a result of a programmatic command by the MGP.

A determination may be made at 310 whether the images obtained for the mosaic should be filtered. For example, the MGP may be configured to filter out images that do not meet a specified quality standard so that such images do not appear in the mosaic. If so, images to be used in the mosaic may be determined at 315. In one embodiment, a quality rating may be associated with each image, and images whose quality ratings are below a specified threshold may be filtered out. For example, quality ratings may be based on the level of blurriness associated with an image and/or objects within an image (e.g., are faces detected via facial recognition in focus, are foreground objects in focus). In another embodiment, similar images (e.g., based on content and time taken) may be treated as a group, and the highest quality (e.g., based on quality ratings) image from the group may be chosen for display in the mosaic. For example, similarity of content may be assessed based on color fingerprints associated with images, and time taken may be determined based on exchangeable image file format (EXIF) data associated with images. It is to be understood that such filtering may affect the number of images used in the mosaic.

A determination may be made at 320 whether to arrange the images based on date. For example, the MGP may be configured to arrange images in the mosaic based on a chronological order. If so, the images may be arranged (e.g., sorted and/or grouped) based on date and/or time at 325. In one implementation, images may be arranged based on the dates and/or times (e.g., determined based on EXIF data) when the images were taken. In another implementation, images may be arranged based on the dates and/or times when the images were uploaded. In yet another implementation, images may be arranged based on the dates and/or times when the images were shared. In one embodiment, template configurations may be organized such that one or more distinct templates and/or template sets are used for each group of images. For example, images taken in January may be positioned in template sets one and two, and images taken in March may be positioned in template set three. In another embodiment, template configurations may be organized such that templates and/or template sets associated with each group of images are arranged based on a chronological order. For example, template sets one and two may be positioned in the mosaic to appear before template set three.

A determination may be made at 330 whether to arrange the images based on theme. For example, the MGP may be configured to arrange images in the mosaic such that one or more distinct templates and/or template sets are used for each theme grouping. If so, the images may be arranged based on theme at 335. In one embodiment, a theme may be based on a location (e.g., a geographic location determined based on EXIF data). For example, images taken in New York may be positioned in template set one, and images taken in California may be positioned in template sets two and three. In another embodiment, a theme may be based on context (e.g., an event, an environment). For example, images taken at a wedding may be positioned in template sets one and two, and images taken at beaches may be positioned in template sets three and four.

A determination may be made at 340 whether to arrange the images based on balanced sizing of images. For example, the MGP may be configured to arrange images in the mosaic such that each template and/or template set is configured to have one or two leading pictures (e.g., pictures with people), and some smaller supporting pictures (e.g., scenery pictures). If so, the images may be arranged based on balanced sizing of images at 345. For example, template configurations may be organized such that each template set (e.g., a wide template followed by a narrow template) has a leading picture in an image tile of the wide template and supporting pictures in other image tiles of the wide template and in image tiles of the narrow template. In another example, template configurations may be organized such that each template set (e.g., a narrow template followed by a wide template) has a leading picture in an image tile of the wide template and in an image tile of the narrow template, and supporting pictures in other image tiles of the wide template and of the narrow template.

It is to be understood that arrangement of images may be performed in a variety of orders and/or ways. For example, images may be arranged based on date and then based on theme. In another example, images may be arranged based on theme and then based on date. Template configurations may be determined at 350 based on the way the images are arranged. In one embodiment, template configurations may be determined such that the resulting configurations result in a mosaic that displays the images in accordance with the way the images are arranged. In one implementation, to make this determination the MGP may iterate through the available templates and/or template sets and select combinations of templates and/or template sets that conform to the specified image arrangement. For example, if the images are arranged into groups of five vacation images (e.g., with one leading picture) taken in June and ten birthday images (e.g., with three leading pictures) taken in July, and template sets are made up of a wide template followed by a narrow template and each template set is designed to have between two and seven image tiles, template configurations may be determined as follows. One template set may be used for the five vacation images. This template set may be made up of templates that result in the number of image tiles for the template set to be five (e.g., a wide template with one image tile and a narrow template with four image tiles, a wide template with two image tiles and a narrow template with three image tiles, a wide template with three image tiles and a narrow template with two image tiles, a wide template with four image tiles and a narrow template with one image tile). It is to be understood that multiple templates with the same number of image tiles may be available (e.g., a template with three image tiles may be template with a big top image tile and two smaller bottom image tiles, or a template with two smaller top image tiles and one big bottom image tile) and that certain templates may not appear next to each other (e.g., based on a maximum difference in number of image tiles parameter). Between two and three template sets may be used for the ten birthday images (e.g., four or five template sets may not be used because each template set would not have between one and two leading images, one or more than five template sets may not be used because each template set would not have between two and seven image tiles). These template sets may be made up of templates that result in the number of image tiles for the group of template sets to be ten and may be positioned after the template set used for the vacation images. Each allowable permutation of templates and/or template sets is a template configuration.

A determination may be made at 360 whether to eliminate certain template configurations to avoid template and/or template set repetition. For example, the MGP may be configured to eliminate template configurations that result in two identical templates appearing next to each other. If so, template configurations that result in template and/or template set repetition may be eliminated at 365. For example, template configurations that result in two identical templates and/or template sets appearing next to each other may be eliminated. In another example, template configurations that result in two templates and/or template sets appearing too close to each other (e.g., based on a minimum distance parameter) may be eliminated.

APPENDICES 1-2 illustrate additional exemplary embodiments of the MGP.

Detailed Description of the MGP Coordinator

Figure 4:
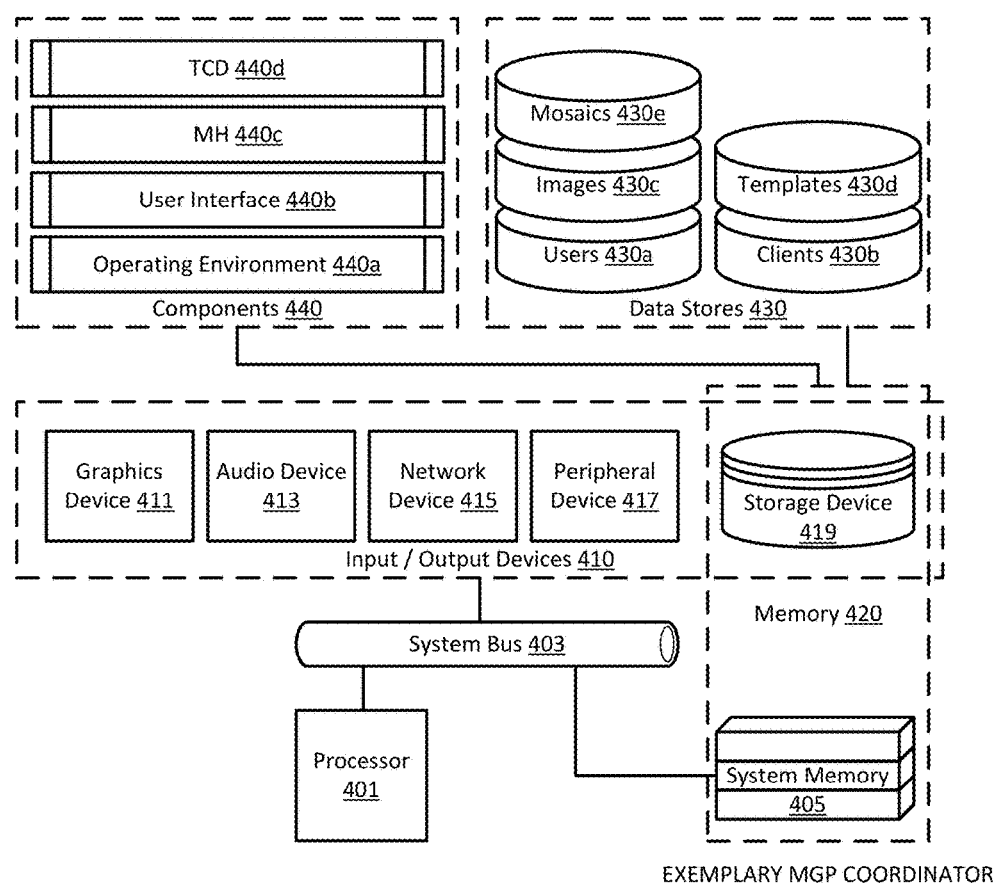
FIG. 4 shows a block diagram illustrating an exemplary MGP coordinator in one embodiment of the MGP.

FIG. 4 shows a block diagram illustrating an exemplary MGP coordinator in one embodiment of the MGP. The MGP coordinator facilitates the operation of the MGP via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the MGP coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the MGP coordinator may comprise a stand-alone computer system, a distributed computer system, a node in a computer network (i.e., a network of computer systems organized in a topology), a network of MGP coordinators, and/or the like. It is to be understood that the MGP coordinator and/or the various MGP coordinator elements (e.g., processor, system bus, memory, input/output devices) may be organized in any number of ways (i.e., using any number and configuration of computer systems, computer networks, nodes, MGP coordinator elements, and/or the like) to facilitate MGP operation. Furthermore, it is to be understood that the various MGP coordinator computer systems, MGP coordinator computer networks, MGP coordinator nodes, MGP coordinator elements, and/or the like may communicate among each other in any number of ways to facilitate MGP operation. As used in this disclosure, the term "user" refers generally to people and/or computer systems that interact with the MGP; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The MGP coordinator includes a processor 401 that executes program instructions (e.g., MGP program instructions). In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 405 via a system bus 403. The system bus may interconnect these and/or other elements of the MGP coordinator via electrical, electronic, optical, wireless, and/or the like communication links (e.g., the system bus may be integrated into a motherboard that interconnects MGP coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions (e.g., MGP program instructions) executed by the processor. The system memory may facilitate accessing, storing, retrieving, modifying, deleting, and/or the like data (e.g., MGP data) by the processor.

In various embodiments, input/output devices 410 may be connected to the processor and/or to the system memory, and/or to one another via the system bus.

In some embodiments, the input/output devices may include one or more graphics devices 411. The processor may make use of the one or more graphic devices in accordance with program instructions (e.g., MGP program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., MGP data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions (e.g., MGP program instructions) executed by the processor. In one implementation, an audio device may be a sound card that may obtain (e.g., via a connected microphone), process, output (e.g., via connected speakers), and/or the like audio data (e.g., MGP data). A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions (e.g., MGP program instructions) executed by the processor. In one implementation, a network device may be a network card that may obtain (e.g., via a Category 5 Ethernet cable), process, output (e.g., via a wireless antenna), and/or the like network data (e.g., MGP data). A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX- MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 417. The processor may make use of the one or more peripheral devices in accordance with program instructions (e.g., MGP program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the MGP coordinator with a variety of input, output and processing capabilities.

In some embodiments, the input/output devices may include one or more storage devices 419. The processor may access, read from, write to, store in, erase, modify, and/or the like a storage device in accordance with program instructions (e.g., MGP program instructions) executed by the processor. A storage device may facilitate accessing, storing, retrieving, modifying, deleting, and/or the like data (e.g., MGP data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 405 and the one or more storage devices 419 may be referred to as memory 420 (i.e., physical memory).

MGP memory 420 contains processor-operable (e.g., accessible) MGP data stores 430. Data stores 430 comprise data that may be used (e.g., by the MGP) via the MGP coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, MGP coordinator elements, and/or the like) to facilitate MGP operation. For example, MGP data stores may comprise data stores 430*a-e* implemented as one or more databases. A users data store 430*a* may be a collection of database tables that include fields such as UserID, UserName, UserPreferences, UserImages, UserMosaics, and/or the like. A clients data store 430*b* may be a collection of database tables that include fields such as ClientID, ClientName, ClientDeviceType, ClientScreenResolution, and/or the like. An images data store 430*c* may be a collection of database tables that include fields such as ImageID, ImageName, ImageTopic, ImageComments, ImageResolution, ImageOrientation, and/or the like. A templates data store 430*d* may be a collection of database tables that include fields such as TemplateID, TemplateName, TemplateTiles, and/or the like. A mosaics data store 430e may be a collection of database tables that include fields such as MosaicID, MosaicName, MosaicComments, MosaicSharingSettings, and/or the like. The MGP coordinator may use data stores 430 to keep track of inputs, parameters, settings, variables, records, outputs, and/or the like.

MGP memory 420 contains processor-operable (e.g., executable) MGP components 440. Components 440 comprise program components (including program instructions and any associated data stores) that are executed (e.g., by the MGP) via the MGP coordinator (i.e., via the processor) to transform MGP inputs into MGP outputs. It is to be understood that the various components and their subcomponents, capabilities, applications, and/or the like may be organized in any number of ways (i.e., using any number and configuration of components, subcomponents, capabilities, applications, MGP coordinator elements, and/or the like) to facilitate MGP operation. Furthermore, it is to be understood that the various components and their subcomponents, capabilities, applications, and/or the like may communicate among each other in any number of ways to facilitate MGP operation. For example, the various components and their subcomponents, capabilities, applications, and/or the like may be combined, integrated, consolidated, split up, distributed, and/or the like in any number of ways to facilitate MGP operation. In another example, a single or multiple instances of the various components and their subcomponents, capabilities, applications, and/or the like may be instantiated on each of a single MGP coordinator node, across multiple MGP coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), Simple Object Access Protocol (SOAP), SSL, ColdFusion, Microsoft.NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 440 may include an operating environment component 440a. The operating environment component may facilitate operation of the MGP via various subcomponents.

In some implementations, the operating environment component may include an operating system subcomponent. The operating system subcomponent may provide an abstraction layer that facilitates the use of, communication among, common services for, interaction with, security of, and/or the like of various MGP coordinator elements, components, data stores, and/or the like.

In some embodiments, the operating system subcomponent may facilitate execution of program instructions (e.g., MGP program instructions) by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the MGP. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the MGP coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the MGP coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the MGP by providing user interface elements that may be used by the MGP to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., PlasmaDesktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a realtime operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate MGP capabilities such as storage, analysis, retrieval, access, modification, deletion, aggregation, generation, and/or the like of data (e.g., the use of data stores 430). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, and/or the like.

In some implementations, the operating environment component may include an information handling subcomponent. The information handling subcomponent may provide the MGP with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, MGP components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for NET (ADO.NET), and/or the like. For example, the information handling subcomponent may use such standards to store, analyze, retrieve, access, modify, delete, aggregate, generate, and/or the like data (e.g., data from data stores 430) via the database subcomponent.

In some embodiments, the information handling subcomponent may facilitate presentation of information obtained from users, MGP components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate MGP message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XIVIPP), Real-time Transport Protocol (RTP), Internet Relay Chat (IRC), Skype protocol, AOL's Open System for Communication in Realtime (OSCAR), Messaging Application Programming Interface (MAPI), Facebook API, and/or the like to facilitate MGP message communications. The messaging subcomponent may facilitate message communications such as email, instant messaging, Voice over IP (VoIP), video conferencing, Short Message Service (SMS), web chat, and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates MGP security. In some embodiments, the security subcomponent may restrict access to the MGP, to one or more services provided by the MGP, to data associated with the MGP (e.g., stored in data stores 430), to communication messages associated with the MGP, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the MGP may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates MGP virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 440 may include a user interface component 440*b*. The user interface component may facilitate user interaction with the MGP by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 440 may include any of the components MH 440*c*, TCD 440*d* described in more detail in preceding figures.

The Embodiments of the MGP

The entirety of this disclosure (including the written description, figures, claims, abstract, appendices, and/or the like) for MOSAIC GENERATING PLATFORM METHODS, APPARATUSES AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the MGP coordinator, MGP coordinator elements, MGP data stores, MGP components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the MGP coordinator, MGP coordinator elements, MGP data stores, MGP components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, non-provisional applications, continuation applications, continuation-in-part applications, divisional applications, and/or the like. It is to be understood that while some embodiments of the MGP discussed in this disclosure have been directed to generating photo mosaics, the innovations described in this disclosure may be readily applied to a wide variety of other fields and/or applications.

The invention claimed is:

1. A method for generating and displaying a scrolling mosaic of a group of images on a display screen of a computing device having a processor, comprising: displaying a user input interface on the display screen of the computing device to facilitate obtaining or receiving via the processor the group of images; and processing the group of images in order to assemble the scrolling mosaic from a plurality of image templates, each image template including a plurality of image tiles, each image template having a height and width that is the same size as the screen of the computing device wherein a plurality of the image templates have image tiles of varying dimensions, and wherein the mosaic is assembled by:

(a) virtually assembling the plurality of image templates into a linear string of image templates having a linear length that is greater than a length of the display screen of the computing device;

(b) populating the plurality of image tiles within the linear string of image templates with images from the group of images; and (c) displaying the mosaic on the display screen of the computing device.

2. The method of claim 1, further comprising providing a navigation user interface on the display screen of the computing device via the processor to permit a user of the computing device to scroll through the pictures in the mosaic by the user swiping a finger across the display screen of the computing device, wherein the display screen of the computing device is a touch screen.

3. The method of claim 1, further comprising displaying, via processor, the mosaic on the display screen of the computing device as a continuous film strip or as a continuous film loop.

4. The method of claim 1, further comprising providing a sharing user interface via processor to permit a user to share the mosaic with others, wherein the sharing user interface permits the user to share the mosaic with others by actuating an actuator on the display screen of the computing device.

5. The method of claim 1, further comprising ranking via the processor images in the group of images with respect to possible template configurations, wherein a template configuration is defined as a linear ordering of successive templates for assembling the mosaic.

6. The method of claim 5, further comprising calculating, via the processor, overall rankings for the possible template configurations.

7. The method of claim 6, further comprising identifying, via the processor, an optimal template configuration based on the overall rankings.

8. The method of claim 7, further comprising associating dates with each image in the group of images, and placing the images in the assembled mosaic in date order.

9. The method of claim 8, wherein the dates include the date on which the photograph was taken.

10. The method of claim 8, wherein the dates include the date on which the photograph was shared electronically.

11. The method of claim 7, further comprising associating a geographic location with each image in the group of images, grouping images together that were taken in similar geographic locations and placing the images in the assembled mosaic based on geographic grouping.

12. The method of claim 7, further comprising determining a focal point for an image in the group of images via the processor, and adjusting the image's positioning in the mosaic based on the focal point via the processor.

13. The method of claim 12, wherein the focal point of the image is determined using facial recognition, the image includes a person, and the focal point of the image is determined via the processor to be the person's face.

14. The method of claim 13, wherein the focal point of the image is further determined based on the composition of the image by analyzing color bands.

15. The method of claim 14, wherein the color bands are analyzed via the processor to find background or foreground objects.

16. The method of claim 12, wherein the image's positioning in the mosaic is adjusted via the processor by (i) centering the image, (ii) cropping the image, and (iii) resizing the image.

17. The method of claim 16, wherein an image in the group of images is ranked via the processor by assigning a numerical value to the image based on its physical attributes based on a size score associated with placing the image in an image tile for each image tile in each template in the stack of templates, wherein the size score of the image increases the numerical value of the ranking of the image if the image's resolution is higher than or equal to the resolution of an image tile with which it can be associated.

18. The method of claim 1, wherein an image in the group of images is ranked via the processor by assigning a numerical value to the image based at least in part on a content score, wherein the content score is based on at least one of (i) the number of people visible in the image and (ii) whether the image shows scenery.

19. The method of claim 1, wherein an image in the group of images is ranked via the processor by assigning a numerical value to the image based at least in part on a orientation score, wherein the value of the orientation score is computed by comparing, via the processor, the orientation of the image with the orientation of an image tile.

20. The method of claim 1, wherein an image in the group of images is ranked via the processor by assigning a numerical value to the image based at least in part on a color fingerprint of the image, wherein the color fingerprint is computed by comparing, by the processor, the image with other images to be placed in the mosaic, and further wherein the color fingerprint is based on at least one of (i) hue, (ii) saturation and (iii) brightness.

* * * * *